Aug. 12, 1958 G. A. LYON 2,847,252
WHEEL COVER
Filed March 4, 1953 2 Sheets-Sheet 1
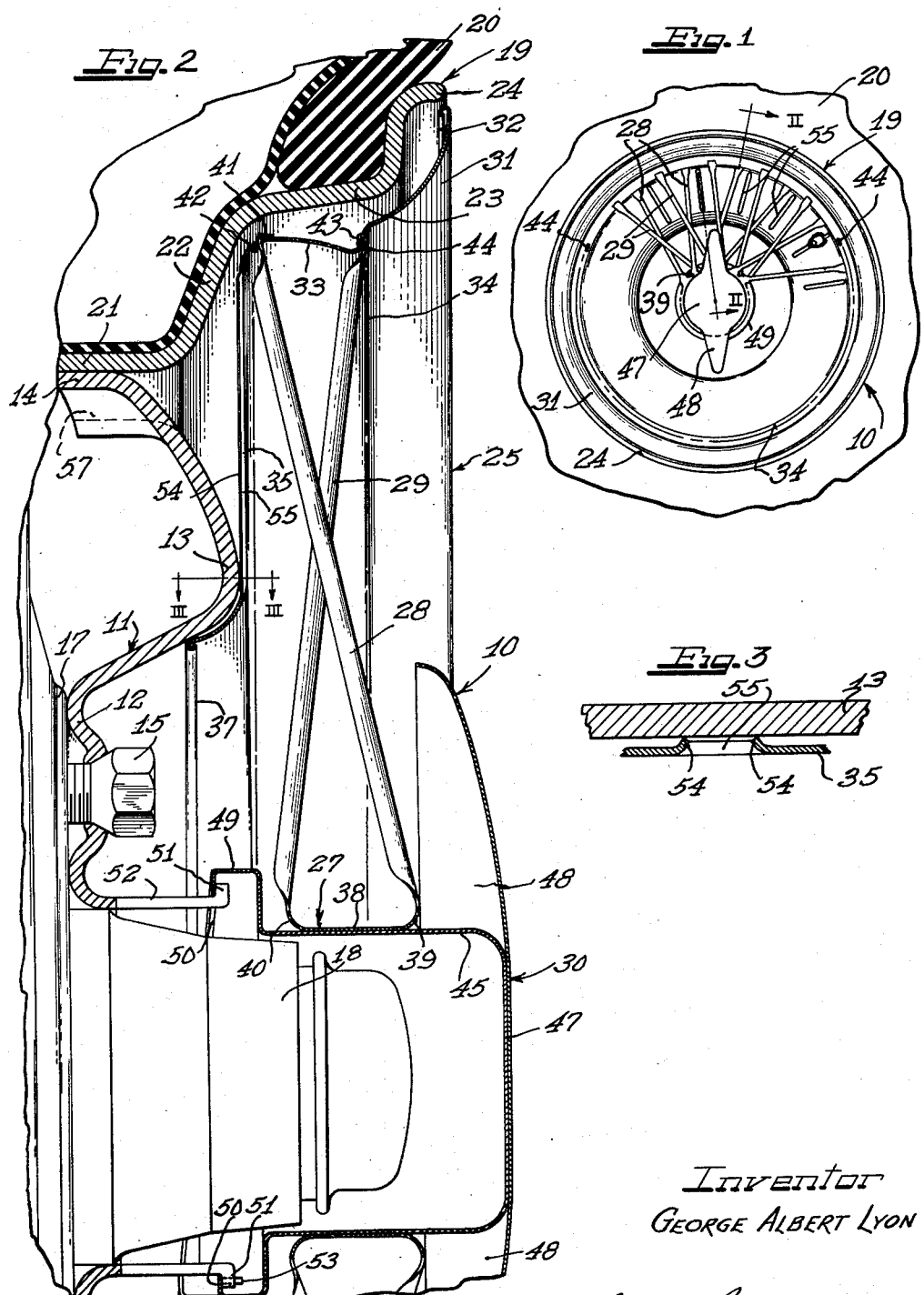
Inventor
GEORGE ALBERT LYON Aug. 12, 1958     G. A. LYON     2,847,252
WHEEL COVER
Filed March 4, 1953     2 Sheets-Sheet 2
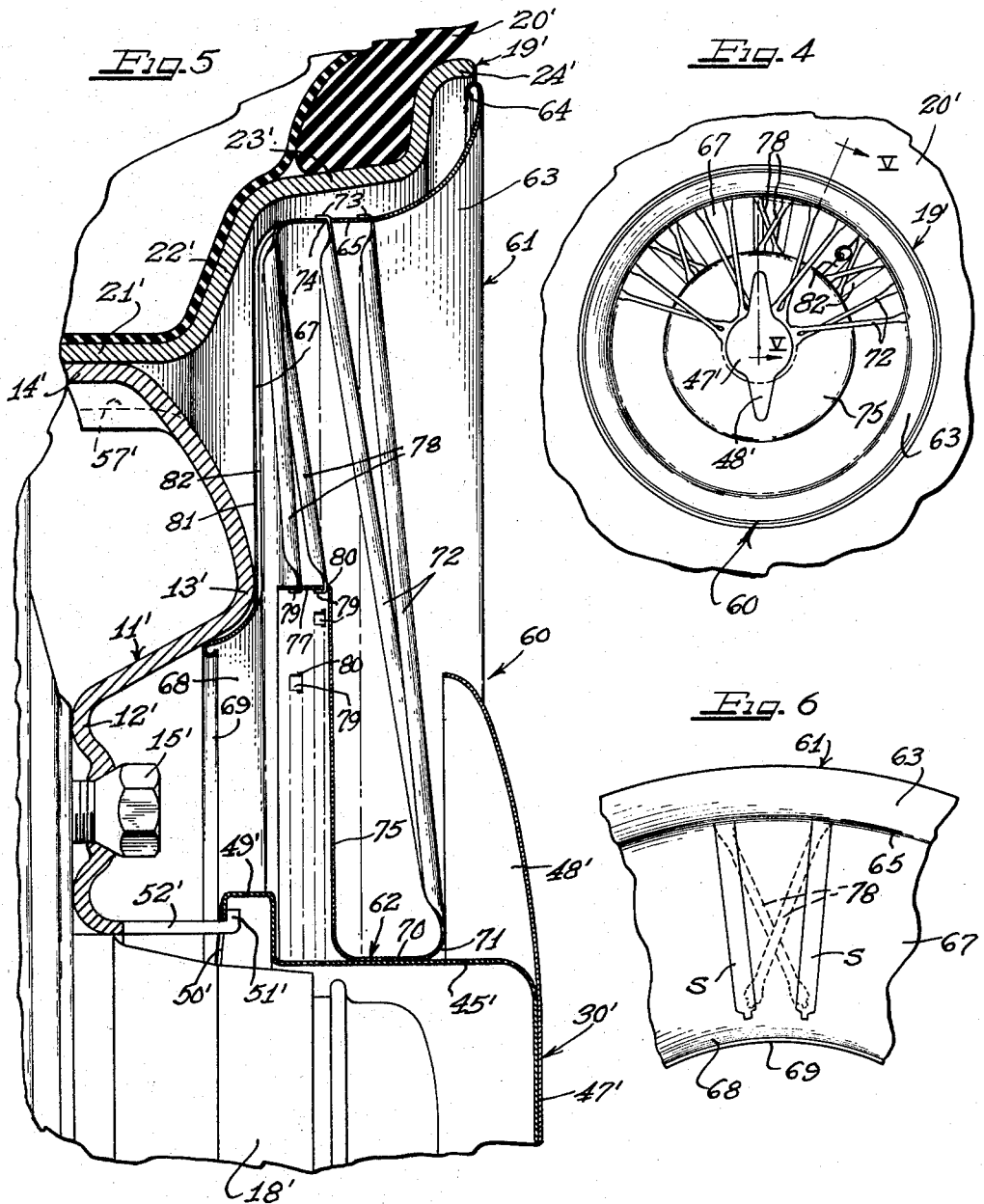
Inventor
GEORGE ALBERT LYON United States Patent Office 2,847,252
Patented Aug. 12, 1958

2,847,252

WHEEL COVER

George Albert Lyon, Detroit, Mich.

Application March 4, 1953, Serial No. 340,184

13 Claims. (Cl. 301—37)

The present invention relates to improvements in wheel structures and more particularly concerns the ornamental and protective covering of the outer sides of vehicle wheels.

An important object of the present invention is to provide a wheel structure of the non-spoke type having on the outer side thereof novel wire spoke simulating means to afford the illusion of the wheel being a wire spoke type of wheel.

Another object of the invention is to provide in a wheel structure improved means for attaching thereto a spoke simulating wheel structure in non-rotary relation to the wheel.

A further object of the invention is to provide a novel wheel cover assembly for the outer side of a vehicle wheel of non-spoke type to afford the illusion of the wheel being a wire spoke type of wheel.

Still another object of the invention is to provide a novel spoke wheel simulating cover for disposition at the outer side of a disk spider wheel.

Still another object of the invention is to provide an improved spoke wheel simulating wheel cover of knock-off, centrally attached type.

Other objects, features and advantages of the present invention will be readily apparent from the following detailed description of certain preferred embodiments thereof taken in conjunction with the accompanying drawings in which:

Figure 1 is a side elevational view of a wheel structure embodying features of the invention;

Figure 2 is an enlarged fragmentary transverse sectional view taken substantially on the line II—II of Figure 1;

Figure 3 is an enlarged fragmentary sectional detail view taken substantially on the line III—III of Figure 2;

Figure 4 is a side elevational view of a wheel structure showing a modified form of the cover thereon;

Figure 5 is an enlarged transverse sectional view taken substantially on the line V—V of Figure 4; and Figure 6 is a fragmentary elevational view of one of the cover components of Figures 4 and 5 showing how spoke elements are derived therefrom.

Having reference to Figures 1, 2 and 3, a cover 10 is shown for disposition at the outer side of a vehicle wheel of the disk spider type comprising a wheel body 11 having a central dished bolt-on flange 12, an intermediate annular reenforcing nose bulge 13 and an outer peripheral generally axially inwardly extending attachment flange 14. The bolt-on flange 12 is adapted to be secured as by means of attachment bolts or cap screws 15 to a hub flange 17 disposed about a wheel axial hub structure 18.

A tire rim 19 is supported by the wheel body 11 and is preferably of the drop center multi-flange type adapted for supporting a pneumatic tire and tube assembly 20. To this end, the tire rim 19 has a base flange 21 secured in suitable fashion to the attachment flange 14 of the wheel body. Extending generally radially outwardly from the outer side of the base flange 21 is a side flange 22 which merges with a generally axially outwardly and radially outwardly sloping intermediate flange 23 that merges with a terminal flange 24.

According to the present invention the cover 10 comprises three major components, one of which is an annular radially outer cover member 25 dimensioned to substantially overlie the tire rim 19 and a substantial portion of the body 11, a second cover component or member 27 provided with respective series of crossing spoke simulating elements 28 and 29, and a third cover component 30 in the form of a latching device.

The outer annular cover component 25 comprises an outer marginal rib-like concave convex annular portion 31 having its outer edge extremity turned under to provide a reenforcing and finishing bead 32. The portion 31 is dimensioned to substantially overlie the terminal flange 24 and extends generally axially and radially inwardly to a generally axially inwardly extending flange portion 33 disposed to lie radially inwardly in spaced relation to the intermediate flange 23 and joined to the marginal portion 31 by an offsetting generally axially outwardly facing annular shoulder 34. Projecting radially inwardly from the inner side of the flange 33 is a resilient annular flange 35 arranged to extend into overlying relation to the nose bulge 13 to engage the same as shown in Figure 2. At its inner margin the flange 35 is turned over to telescope the inner side of the nose bulge 13 and is provided with a reenforcing and finishing terminal bead 37. The flange 35 is of diaphragm-like resiliency between the relatively rigid juncture with the outer flange 33 and the relatively rigid inner turned margin 37 of the flange 35.

The second cover component 27 is constructed as a generally cylindrical ring body 38 having an axially outer turned margin 39 from which the spoke simulating elements 28 project as integral extensions. At its inner margin the ring body 38 is provided with a turned stiffening flange 40 from which the spoke simulating elements 29 extend as integral extensions. The cover member 27 is made from suitable sheet material such as stainless steel or brass and the spoke extension elements 28 and 29 are formed as originally flat portions that are then shaped into half round or three-quarter round or full round form to afford adequate stiffness and resistance to deformation and to provide an appearance of wire spokes. The spoke elements 28 and 29 may be polished or plated and burnished to a high luster, or they may be painted, as preferred.

In the present instance, the spoke elements 28 and 29 are disposed in crossing angular relation, the spoke elements 28 extending generally radially outwardly and peripherally generally clockwise and also axially inwardly to cross under the spoke elements 29 which extend generally radially outwardly and axially outwardly and peripherally counter-clockwise as viewed from the front of the cover in crossing over relation to the spoke elements 28, as best seen in Figure 1.

At their outer ends, the spoke elements 28 are provided with retaining flanges 41 which project through respective slots 42 formed in the cover flange portion 33 adjacent juncture thereof with the flange 35. The flanges 41 are turned over into clenching relation to the margin defining the apertures 42 to prevent withdrawal from the flange 33. Similarly, the outer ends of the spoke elements 29 are provided with respective retaining flange lugs 43 which extend through respective slots 44 provided therefor in the shoulder 34. The flanges 43 are turned over into clenching engagement with the margin defining the apertures 44. It will thus be observed that the spoke elements 28 and 29 fixedly connect the annular cover member 25 and the annular cover member 27, For attaching the cover to the wheel, the central, latching cover component 30 is constructed with a central, generally cylindrical wall, cup-shaped hub portion 45 dimensioned to telescope rotatably the cover ring 38. The closed wall end of the member 45 is directed axially outwardly and has attached thereto as by spot welding or the like a sheet metal handle 47 provided with diametrically opposite horn-like handle portions 48. At its inner end portion the member 45 is provided with a retaining flange structure 49 having a pair of similar radially inwardly directed spiral cam flanges 50 which are engageable with respective diametrically opposite radially inwardly turned retaining lugs 51 on respective axially outwardly directed finger extensions 52 from the inner margin defining the bolt-on flange 12 of the wheel body.

When the cover 10 is off of the wheel, the cover ring 38 is held against separation from the member 45 between the opposed shoulders provided by the flange structure 49 and the inwardly directed edges of the handle horns 48. When the cover is to be applied to the wheel, it is generally centered with respect to the wheel and the central latching member 45 is placed over the axial hub 18 and turned so that the flanges 50 enter at their inner ends into camming retaining engagement with the retaining lugs 51 and then as the member 45 is turned by means of the handle 47 in preferably a clockwise direction, the member 45 is drawn axially inwardly by the inter-action of the flanges 50 and the lugs 51 until axially outwardly directed respective stop flanges 53 at the outer ends of the cam flanges 50 engage the retaining lugs 51 and thus limit the further rotation of the rotary latching device 30. As an incident to turning of the device 30 into retaining engagement with the wheel, the flange 35 of the cover is placed under axially inward compression against the wheel body nose bulge 13 when the shoulder 39 of the ring cover member 27 is engaged and thereby pressed inwardly by the inner edges of the handle 48, as best seen in Figure 2. The resilient tension to which the flange 35 is subjected in this manner reacts axially outwardly through the outer portion or cover member 25 and through the spokes 28 and 29 upon the ring member 27 and the cover is thus held in rattle free firm engagement with the wheel. It will be observed that the outer cover member 25 is preferably held free from engagement with the tire rim 19 by the supporting flange 35.

In order to retain the cover assembly comprising the outer annular member 25 and the inter-connected inner cover ring 27 against turning relative to the wheel as an incident to torque forces imposed on the cover in service, the flange portion 35, especially in the area thereof which engages the nose bulge 13 is preferably provided with anti-turn spur means in the present instance comprising generally axially inwardly turned side edge flanges 54 defining slots 55 in the flange 35. By preference the slots 55 extend radially in the flange 35 opposite the juncture of the wheel body with the tire rim and more especially opposite wheel openings 57 provided in the wheel by inset portions of the attachment flange 14. The wheel openings 57 may be provided at three to five equally spaced intervals about the wheel for air circulation through the wheel. The slots 55, therefore, enable air circulation through the cover and more particularly past the flange 35 and through the openings between the spokes 28 and 29.

The turned edges 54 are directed more or less convergently toward one another at the respective sides of the respective slots 55 so that the flanges present sharp edges that will retainingly bite into the opposing surface of the nose bulge 13 by virtue of the pressure effected through the compression and tensioning of the flange 35 as an incident to application of the cover and retention of the cover on the wheel under the latching action of the latching device 30. Since there are a substantial number of the edges 54 provided circumferentially about the flange 35 and the edges 54 extend in opposite operative directions, it will be readily apparent that the cover is quite effectively retained against turning in either rotary direction.

In the modification of Figures 4, 5, and 6, the wheel itself is in all essential respects the same as the wheel shown in Figures 1 and 2 and therefor identical primed reference numerals have been applied to the elements thereof, the description for the corresponding elements as given in connection with Figures 1 and 2 being, therefore, applicable. To the outer side of the wheel in Figures 4 and 5 is applied a wheel cover 60 which in general respects is much the same as the cover 10 of Figures 1 and 2, but embodies certain modifications.

In the wheel cover 60, a central latching device 30' is employed which in all essential respects is the same as the latching device 30 of Figures 1 and 2 and the same, but primed, reference numerals have been applied to the details of the latching device 30' to indicate such similarity and the description for the device 30 is equally applicable.

The cover 60 differs from the cover 10 in that a radially outer annular cover member 61 and a radially inner annular or ring shaped cover member 62 are connected together by a different spoke simulating arrangement. To this end the outer annular cover member 61 comprises a concave convex outer marginal portion 63 dimensioned to substantially overlie the tire rim terminal flange 24' and with its outer edge turned under to provide a reenforcing and finishing bead 64. The member 61 slopes generally radially and axially inwardly from its outer edge and has a generally axially extending intermediate flange 65 of a diameter somewhat less than the inside diameter of the intermediate flange 23' of the tire rim and arranged to lie in generally concentric relation within the intermediate flange. At its inner margin the intermediate flange 65 merges with a radially inwardly extending backing flange 67 dimensioned to engage at its inner margin against the nose bulge 13' of the wheel body. By preference the inner margin of the flange 67 is provided with a reenforcing generally axially inwardly turned marginal portion 68 having its inner extremity formed into a reenforcing and finishing bead 69.

The inner ring cover member 62 comprises a tubular, preferably cylindrical ring body 70 which is slidably rotatably engaged about the tubular hub member 45' of the latching device 30'. At its outer margin the body 70 is provided with a generally radially outwardly turned shoulder 71 from which extend a series of pairs of crossing spoke simulating extension members 72. The extension members 72 are preferably formed as integral extensions in one piece from the ring cover shoulder 71 formed as initial elongated strips that are bent and shaped along longitudinal lines into preferably half round or three-quarter round or full round tubular or semi-tubular shape in order to afford rigidity and in order to give the appearance of being wire spokes such as may be used on a wire spoke wheel. As will be observed in Figure 4, the spoke elements 72 are disposed in generally X-crossing relationship by pairs and directed generally radially outwardly and somewhat axially inwardly oblique to engagement at their outer ends with the flange 65 of the outer annular cover member 61. Connection of the spoke elements 72 with the flange 65 is effected by projection through the flange 65 of respective attachment terminal flanges 73 on the spoke element 72 through respective slots 74 provided therefor in the flange 65. After the spoke terminal flanges 73 have been extended through the slots 74 the flanges are preferably bent over into retaining, clenching relation to the radially outer side of the flange 65.

At its inner margin the ring cover member body 70 is provided with a radially outwardly extending annular flange 75 of substantial diameter, preferably sufficient to overlie the radially inner portion 68 of the flange 67, substantially as shown in Figure 5. At its radially outer extremity the flange 75 is turned axially inwardly to afford an annular, preferably substantially cylindrical extremity flange 77 which faces radially outwardly.

The terminal flange 77 provides convenient anchorage for a series of short spoke elements 78 which are preferably formed from struck-up portions of the flange 67.

In making the spoke elements 78, adjacent radially extending strips S are struck-up from the flange 67 with integral attachment of the radially outer ends of the strips S to the member 61 at juncture of the flange 67 with the intermediate flange 65, as best seen in Figure 6. The strips S are then shaped along longitudinal lines to afford the half round, three-quarter round or full round rigid spoke shape and the spoke elements 78 are then bent into generally X-shape crossing relation as indicated in dash outline in Figure 6 and shown in full outline in Figure 4. By preference, the spoke elements 78 are disposed by pairs in symmetrical alternating relation to the spoke elements 72 which are also disposed in pairs so that the cover will afford the appearance of a wire spoke wheel in which there are long outer spokes and short inner spokes behind the outer spokes, the short spokes 78 being disposed in spaced relation behind the longer outer spokes 72 and exposed in the spaces between the pairs of outer spokes 72.

As best seen in Figure 5 the short spoke elements 78 are disposed in crossing relation and are obliquely directed radially inwardly and axially outwardly and have their radially inner ends secured to the terminal flange 77 of the inner ring cover member. For this purpose, the short spoke elements 78 have their inner ends provided with retaining terminal flanges 79 engageable through respective slots 80 provided therefor in the flange 77. The flanges 79 are bent over into clenching relation to the radially inner side of the flange 77.

Normally, the spoke elements 72 and 78 support the ring cover member 62 in axially outwardly spaced relation to the outer cover member inner flange 67 so as to afford a range of axial flexure for the flange 67 when the cover is attached to the wheel. Such attachment is, of course, effected by turning the latching mechanism 30' into retaining engagement with the retaining lugs 51' on the wheel body and placing the cover under axially inward compression by shouldering of the edges defining the handle portions 48' against the shoulder 71 to press the cover axially inwardly and thus place the flange 67 under compression against the wheel body 13' and thus tension the flange 67 and retain the cover firmly against rattling on the wheel.

Turning of the cover on the wheel is prevented by respective turn preventing sharp edges turned generally axially inwardly at the margins defining radial openings 82 in the flange 67 left by the striking out of the spoke elements 78. It will be appreciated that the turn preventing edges or spur corners 81 operate in similar manner as the similar edges 54 of the cover 10 as herein before described.

Both of the covers 10 and 60 are easily applicable to and removable from the wheel by appropriate rotary movement of the rotary central latch mechanism. In both instances the covers are held firmly in rattle-free relation on the wheel. Both of the covers are held against torque induced turning on the wheel in service. The latter features assures that after the covers have been placed properly for access to the valve stems of the respective tires carried by the wheel the cover will not turn and shear the valve stem. The covers afford an attractive outer appearance for the wheel and give the illusion of the wheel being a wire spoke wheel. The simulated spoke elements may be colored and the background flange in either of the covers may be polished to afford contrast, or the background flange may be colored in a dark color such as black and the spoke elements polished or plated and burnished to high luster in an attractive contrasting relation. The cover components are made from suitable sheet material such as stainless steel or brass or the like and are thus susceptible of attractive finishing such as polishing or plating or painting, as may be preferred.

It will be understood that modifications and variations may be effected without departing from the scope of the novel concepts of the present invention.

I claim as my invention:

1. In a wheel structure including a tire rim and a wheel body supporting the tire rim, a cover for disposition at the outer side of the wheel comprising an inner annular generally axially extending member, an outer annular member substantially spaced from said inner annular member and dimensioned to substantially overlie the tire rim, said inner annular member having a turned marginal flange on its axially outer side having a series of elongated spoke simulating elements projecting generally radially outwardly therefrom and connected to said outer annular member, and attaching means comprising a rotary latch device including a member slidably rotatable within said inner annular member and engageable with retaining means on the wheel body, said outer annular cover member having means axially inwardly with respect to said spoke simultaing elements engageable under tension with the wheel as an incident to attachment of the cover to the wheel by means of said latch device.

2. In a wheel structure including a tire rim and a wheel body supporting the tire rim, a cover for disposition at the outer side of the wheel comprising an inner annular generally axially extending member, an outer annular member substantially spaced from said inner annular member and dimensioned to substantially overlie the tire rim, said inner annular member having a turned marginal flange on its axially outer side having a series of elongated spoke simulating elements projecting generally radially outwardly therefrom and connected to said outer annular member, one of said members having frictional self-retaining means for retaining the cover in axial position on the wheel, the cover also including means on one of said members engageable under axial pressure with the wheel to hold the cover against turning relative to the wheel in service.

3. In a wheel structure including a tire rim and a wheel body having a central bolt-on flange and an intermediate annular axially outwardly projecting portion, a cover for disposition at the outer side of the wheel comprising an inner annular member, means carried by the cover for retaining the cover on the wheel, an annular outer cover member for overlying the tire rim, said cover members having connecting means maintaining the same in substantially fixed relative relation, said outer cover member having an inwardly directed resilient flange engageable under tension with said annular axially outwardly projecting wheel body portion, said flange having generally axially inwardly directed turn preventing edges grippingly engaging said annular wheel body portion to retain the cover against turning relative to the wheel in service.

4. In a wheel structure including a tire rim and a wheel body having a central bolt-on flange and an intermediate annular axially outwardly projecting portion, a cover for disposition at the outer side of the wheel comprising an inner annular member, means carried by the cover for retaining the cover on the wheel, an annular outer cover member for overlying the tire rim, said cover members having connecting means maintaining the same in substantially fixed relative relation, said outer cover member having an inwardly directed resilient flange engageable under tension with said annular axially outwardly projecting wheel body portion, said flange having generally axially inwardly directed turn preventing edges grippingly engaging said annular cover body portion to retain the cover against turning relative to the wheel in service, said edges defining openings in said flange for air circulation therethrough.

5. In a circular cover for disposition at the outer side of a vehicle wheel and having axially inner and axially outer sides, an annular radially inner cover member, an annular radially outer cover member of larger diameter about said inner member, spoke simulating elements connecting said members, said radially outer cover member having a flange portion extending generally radially inwardly and underlying said spoke simulating elements, said flange portion having air circulation openings therethrough, said openings being defined by generally axially inwardly turned edges for engagement in turn preventing relation with a portion of a wheel to which the cover may be applied.

6. In a cover for disposition at the outer side of a vehicle wheel, an inner cover member, an outer cover member, spoke simulating elements connecting said cover members, one of said cover members having a flange projecting toward the other of said cover members, certain of said spoke simulating elements being struck from said flange and connected integrally at one end with said one cover member and attached at their free ends to the other of said cover members.

7. In a cover for disposition at the outer side of a vehicle wheel, a tubular inner cover member, a circular outer cover member having a portion thereof in radially spaced but opposing relation to said tubular member, said tubular member having respective axially inner and axially outer margins turned toward said outer cover member and integral spoke extensions extending from said turned margins and disposed in crossing relation with the outer ends of the spoke elements from the outer margin of the inner cover member connected to an axially inner portion of said outer cover member and the spoke elements from the inner margin of said inner cover member connected to a portion of said outer cover member spaced axially outwardly from said axially inner portion of the outer cover member.

8. In combination in a cover assembly for disposition at the outer side of a vehicle wheel, radially inner and outer annular cover members, the inner of said cover members comprising a tubular portion having generally radially outwardly turned axially inner and outer margins with spoke extensions projecting therefrom and secured to said annular outer cover member, and a tubular attachment latch member slidably rotatable within said annular inner cover member and having a generally axially outwardly directed shoulder opposing the axially inner turned margin of said inner annular cover member and a generally radially extending handle structure comprising a pair of generally radially outwardly extending ear-like members providing axially inwardly facing shoulder means overlying and opposing the axially outer turned margin of said inner annular cover member and with the handle ear-like members projecting radially outwardly over the spoke extensions.

9. In a wheel structure including a tire rim and a wheel body supporting the same and having a central bolt-on flange and radially outwardly therefrom radially facing and axially outwardly facing portions of the wheel body, a cover for disposition at the outer side of the wheel including a radially inner portion for overlying the bolt-on flange in spaced relation axially outwardly therefrom and a radially outer portion for overlying the tire rim in completely spaced relation thereto, with a portion of the cover intermediate said radially inner and outer portions pressing toward the axially outwardly facing wheel body portion and telescoped with said radially facing wheel body portion, and cover retaining means effecting a connection between the radially inner cover portion and the bolt-on flange and drawing the cover axially inwardly for pressing said intermediate cover portion axially inwardly toward said axially outwardly facing wheel body portion and maintaining said telescoped relationship for thereby maintaining the cover in axial disposition on the wheel.

10. In a wheel structure including a tire rim and a wheel body supporting the tire rim, a cover for disposition over the outer side of the wheel including radially inner and outer portions for respectively overlying the wheel body and the tire rim, one of said cover portions having extending generally radially therefrom a resilient flange engageable against the wheel body for maintaining said cover portions in spaced axially outward relation relative to both the wheel body and the tire rim except for said engagement of the wheel body by the flange, and means for connecting the cover to the wheel and thereby placing said flange under resilient tension against the wheel body.

11. In a cover for disposition at the outer side of a vehicle wheel, radially inner and radially outer annular cover portions of substantially different diameter, with spokes connecting the cover members together, said cover members having respective radially inwardly and radially outwardly extending flanges behind the spokes and arranged in overlapping relation to effect substantially closed background behind the spokes, one of said flanges being disposed axially inwardly relative to the other of the flanges and spaced therefrom and of substantially resilient structure for bottoming in resiliently tensioned engagement against part of a wheel to which the cover may be applied.

12. In a cover for disposition at the outer side of a vehicle wheel, radially inner and radially outer annular cover portions of substantially different diameter, with spokes connecting the cover members together, said cover members having respective radially inwardly and radially outwardly extending flanges behind the spokes and arranged in overlapping relation to effect substantially closed background behind the spokes, one of said flanges being disposed axially inwardly relative to the other of the flanges and spaced therefrom and of substantially resilient structure for bottoming in resiliently tensioned engagement against part of a wheel to which the cover may be applied, said flexible flange having spokes struck therefrom and connected to the axially outermost of the flanges.

13. In a wheel structure including a tire rim and a wheel body supporting the tire rim and providing wheel openings for air circulation adjacent to the tire rim, a cover for disposition in overlying relation to the outer side of the wheel and having portions thereof for respectively overlying the tire rim and the wheel body and radially separated but connected together by means of spokes, one of said cover portions having extending generally radially therefrom and into overlying relation to the wheel openings and between the spokes and the wheel a flange providing a background behind the spokes, said flange having air circulation openings therethrough overlying the wheel openings for air circulation through the wheel openings and said openings in the flange, and means for connecting the cover to the wheel.

References Cited in the file of this patent

UNITED STATES PATENTS

| | | |
|---|---|---|
| D. 169,514 | McLeod | May 5, 1953 |
| 2,013,895 | Pannecoucke et al. | Sept. 10, 1935 |
| 2,162,730 | Lyon | June 20, 1939 |
| 2,190,669 | Lyon | Feb. 20, 1940 |
| 2,308,617 | Lyon | Jan. 19, 1943 |
| 2,329,945 | Schatzman | Sept. 21, 1943 |
| 2,441,008 | Chase | May 4, 1948 |

FOREIGN PATENTS

| | | |
|---|---|---|
| 714,587 | France | Sept. 7, 1931 |
| 526,576 | Great Britain | Sept. 20, 1940 |
| 436,894 | Italy | June 16, 1948 |